Patented Oct. 16, 1928.

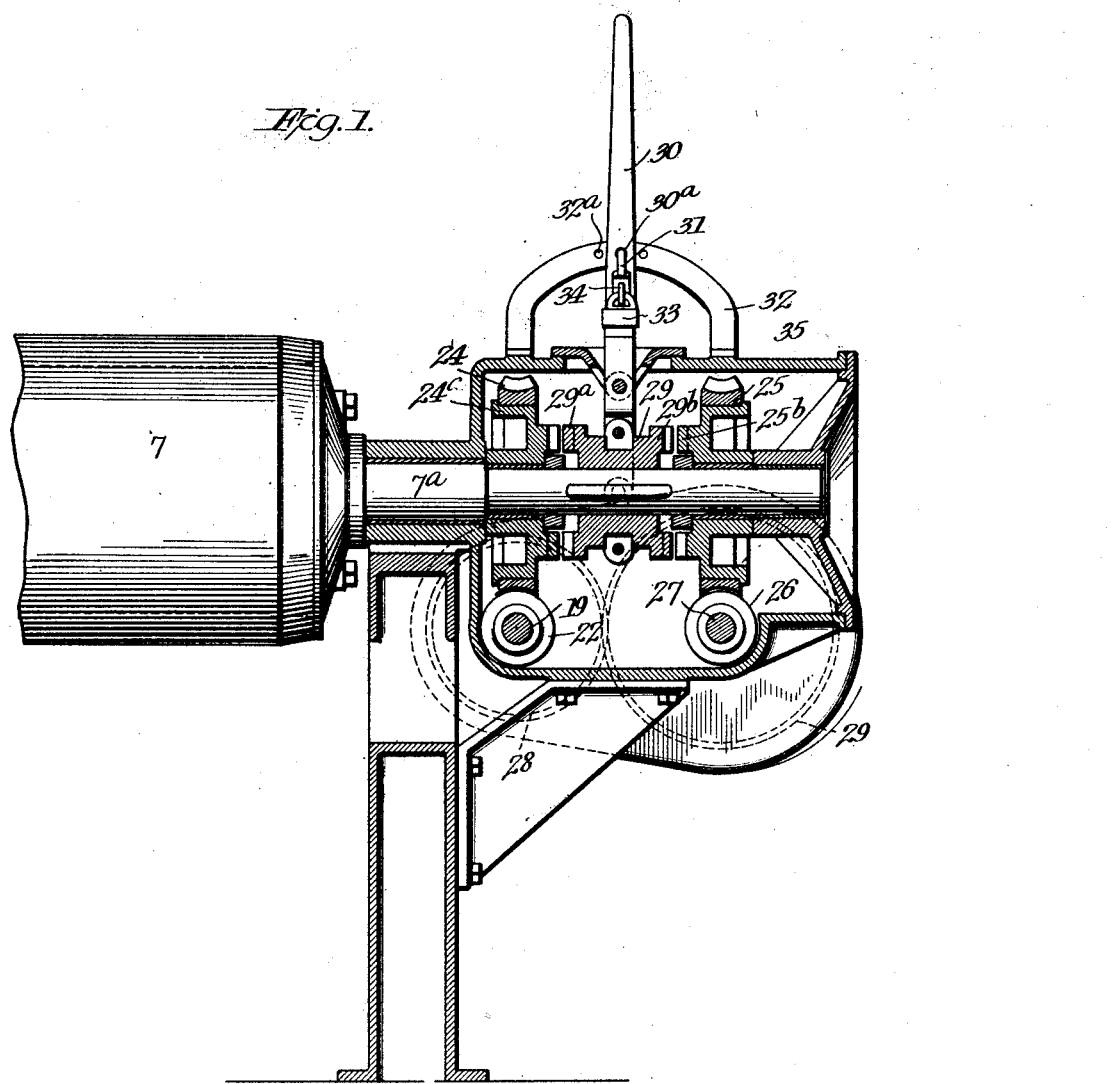

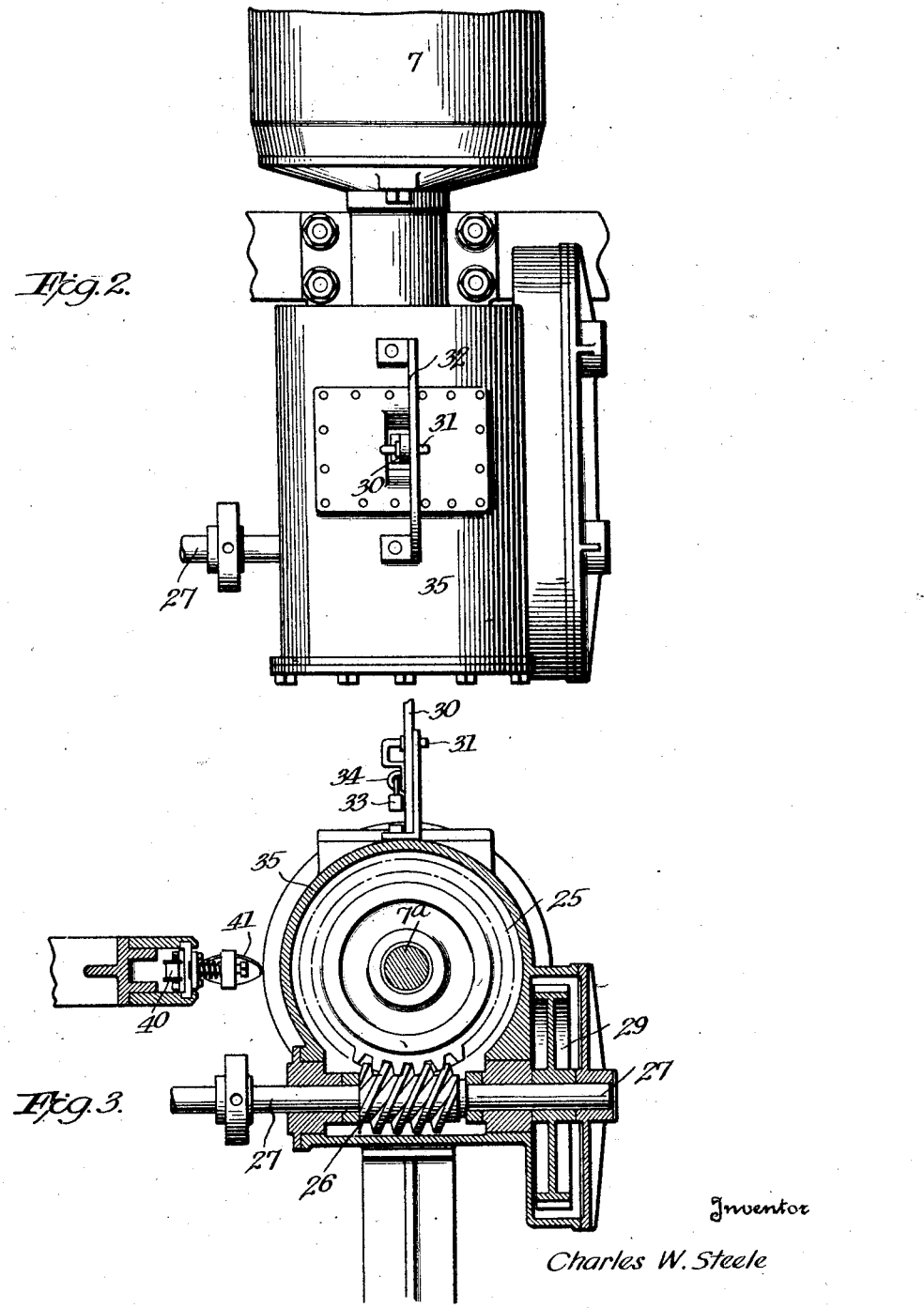

1,687,598

UNITED STATES PATENT OFFICE.

CHARLES W. STEELE, OF AKRON, OHIO, ASSIGNOR TO THE MILLER RUBBER COMPANY, OF AKRON, OHIO, A CORPORATION OF OHIO.

ROTARY BIAS CUTTER.

Application filed November 3, 1927. Serial No. 230,789.

My present invention relates to bias cutting machines of the type in which a continuous traveling web is passed around a platen cylinder and severed along diagonal lines by an endless series of spaced cutters traveling lengthwise of the cylinder. The invention is designed specifically as an improvement upon the apparatus which forms the subject of Letters Patent of the United States #1,635,531, granted on the 12th day of July, 1927, to The Miller Rubber Co. as assignee of James W. Brundage. Such machines are largely used in the cutting of rubberized fabric for the manufacture of pneumatic tire casings.

For some purposes it is desirable to sever the web at an angle different from that for other purposes; for example, part of the time it is desired to produce strips cut at an angle of 45° and at others at an angle of 35°, and this invention aims to so improve the machine disclosed in the aforesaid patent that it will be capable of being used to cut strips of either angle desired.

With this and other objects in view the invention includes the novel construction hereinafter described and particularly defined by the appended claims.

An embodiment of the invention is illustrated in the accompanying drawings, in which:—

Fig. 1 is a transverse vertical section on the axial line of the platen shaft, showing the right-hand end thereof and adjacent portion of the platen cylinder in elevation.

Fig. 2 is a plan view of the same.

Fig. 3 is a vertical section on the axial line of shaft 27 of Fig. 1 showing said shaft in elevation and showing also one of the cutters cooperating with the platen cylinder, the cutter guide being shown in section and broken away.

As the invention concerns only the cutter mechanism and platen driving means, I have, to simplify matters, refrained from illustrating the entire machine, which, it will be understood, except as to matters herein described, is constructed and operated as clearly disclosed in the aforesaid patent.

Referring by reference characters to these drawings, 7 designates the platen cylinder and 7ª the supporting and driving shaft therefor which latter has loose thereon a worm wheel 24 meshing with a worm 22 on the cutter and platen drive shaft 19, these being the same reference characters as used in the aforesaid patent, as is also the numeral 40 which designates the cutter carrying chain carrying the cutters 41 and mounted and operated as in said patent. Shaft 7ª is extended over what is shown in said patent and carries adjacent its outer end (or properly spaced from worm wheel 24) a second worm wheel 25 which is also loose on the platen shaft and meshes with a worm 26 fast on a countershaft 27, said countershaft 27 being driven from shaft 19 by means such as intermeshing spur gears 28 and 29 of such relative size that shaft 26 is driven at a faster speed than shaft 19.

Means is provided for selectively clutching the worm wheels 24 and 25 whereby the platen cylinder may be driven at a faster or slower speed relative to shaft 19, and such means preferably takes the form of a double clutch member 29 splined to shaft 7ª and having toothed clutch portions 29ª and 29ᵇ designed respectively to engage correspondingly toothed clutch portions 24ª and 25ᵇ on the hubs of worm gears 24 and 25 respectively.

Clutch member 29 is operated by a shifter fork 30 having a suitable operating handle and preferably provided with means by which it may be locked in position to engage one or the other of the worm wheel clutch members, or in neutral position, which means may take the form of a pin member 31 designed to pass through a hole 30ª in the shift lever 30 and any one of three holes 32ª in the bracket bar 32. Such pin 31 may be locked in place by padlock 33 engaging a staple 34 passing through a corresponding elongated recess in a hasp like extension of the pin member.

The endless chain of cutters being driven at a constant rate of speed from the shaft 19 the angle of cut will be determined by the speed of rotation of the platen. If, therefore, a bias cut of 45° is desired worm wheel 24 is clutched to the shaft and worm wheel 25 allowed to run free, while if a bias cut of 35° is desired worm wheel 25 is clutched to the platen shaft. In addition to the selective clutching above described, it is necessary when disc cutters are used to change the angle of the cutters to correspond which may be done by removing the chain having cutters set at the one angle and substituting a chain having the cutters set at the other angle.

What I claim is:

1. In a machine of the class described, a platen roll, an endless chain having spaced apart cutters arranged to travel longitudinally of the platen roll, means for driving said chain at a uniform rate of speed, and means for selectively driving said roll at different rates of speed.

2. In a machine of the class described, a platen roll having a roll shaft, an endless chain of spaced apart cutters arranged to travel lengthwise of the roll, a drive shaft operatively connected with said endless chain of cutters, a worm wheel loose on said shaft, a worm on the drive shaft engaging said worm wheel, a second worm wheel on said shaft, a countershaft driven from said drive shaft at a different rate of speed, a worm on said countershaft engaging said second worm wheel, and means for selectively clutching said worm wheels to the platen roll shaft.

In testimony whereof, I affix my signature.

CHARLES W. STEELE.